United States Patent
Rodriguez

(10) Patent No.: US 9,452,599 B1
(45) Date of Patent: Sep. 27, 2016

(54) APPARATUS FOR REMOVAL OF FLOORING

(71) Applicant: Hector Rodriguez, Sylmar, CA (US)

(72) Inventor: Hector Rodriguez, Sylmar, CA (US)

( * ) Notice: Subject to any disclaimer, the term of this patent is extended or adjusted under 35 U.S.C. 154(b) by 0 days.

(21) Appl. No.: 14/674,568

(22) Filed: Mar. 31, 2015

(51) Int. Cl.
*B32B 38/10* (2006.01)
*B32B 43/00* (2006.01)
*B25D 17/32* (2006.01)

(52) U.S. Cl.
CPC ............. *B32B 43/006* (2013.01); *B25D 17/32* (2013.01); *B32B 38/10* (2013.01); *B32B 2419/04* (2013.01); *B32B 2471/00* (2013.01); *Y10T 156/1179* (2015.01); *Y10T 156/1184* (2015.01); *Y10T 156/1961* (2015.01); *Y10T 156/1967* (2015.01)

(58) Field of Classification Search
CPC ................ B32B 38/10; B32B 43/006; Y10T 156/1179; Y10T 156/1184; Y10T 156/1961; Y10T 156/1967
USPC .................................. 156/716, 717, 761, 762
See application file for complete search history.

(56) References Cited

U.S. PATENT DOCUMENTS

| | | | | | |
|---|---|---|---|---|---|
| 2,519,138 | A | * | 8/1950 | Katz | E04D 15/003 15/93.1 |
| 2,655,976 | A | * | 10/1953 | Lovin | E04G 23/006 156/714 |
| 4,963,224 | A | * | 10/1990 | Anderson | A47G 27/0487 156/717 |
| 4,981,548 | A | * | 1/1991 | Poll | E02F 5/12 156/499 |
| 5,082,330 | A | * | 1/1992 | Holder | E04G 23/006 15/93.1 |
| 5,713,637 | A | * | 2/1998 | Worden | E04G 23/006 15/93.1 |
| 5,720,844 | A | * | 2/1998 | Hanson | E04G 23/006 156/717 |
| 5,830,313 | A | * | 11/1998 | Smith | E04G 23/006 156/717 |
| 6,092,876 | A | * | 7/2000 | Arbucci | E02F 3/815 15/93.1 |
| 6,135,566 | A | * | 10/2000 | Anderson | E04G 23/006 299/36.1 |
| 6,343,981 | B1 | * | 2/2002 | Buchanan | E04G 23/006 156/763 |
| 7,093,906 | B1 | * | 8/2006 | Davidson | E02F 3/7618 15/93.1 |
| 8,251,117 | B2 | * | 8/2012 | Kron | E04G 23/006 156/715 |
| 2002/0108720 | A1 | * | 8/2002 | Fitterer | E04G 23/006 156/429 |

* cited by examiner

*Primary Examiner* — Mark A Osele
*Assistant Examiner* — Nickolas Harm
(74) *Attorney, Agent, or Firm* — Cotman IP Law Group, PLC

(57) ABSTRACT

An apparatus for removal of flooring is presented. The flooring removal apparatus comprises a telescopically adjustable top frame with front wheels and a telescopically adjustable vertical rear frame coupled to the rear side of the top frame. The vertical rear frame includes a pair of rear wheels for directional control. The top frame is configured with one or more braces to securely clamp the housing of a jack hammer. An adapter suitable for a particular flooring type is provided for coupling to the tip of the jack hammer.

20 Claims, 9 Drawing Sheets

APPARATUS FOR REMOVAL OF FLOORING

BACKGROUND OF THE INVENTION

1. Field of the Invention

Embodiments of the invention relates to the field of construction equipment. More specifically, the invention relates to apparatus for removal of floor coverings.

2. Description of the Related Art

The invention relates to a portable apparatus for removal of flooring material that has been glued to or similarly secured to sub-flooring, e.g. floor tiles, linoleum sheets, etc.

Floor covering materials are widely used because they are versatile, inexpensive to purchase and install and are easily maintained. They are used in commercial and residential properties. However, the removal of such flooring material is both a labor intensive and time-consuming endeavor using currently available tools.

There are currently several motorized tile covering removal tools available in the marketplace today, but none of them are efficient, thus requiring several hours to remove flooring from an average sized room. In addition, these tools are generally specialized systems thus expensive to purchase and maintain.

BRIEF SUMMARY OF THE INVENTION

One or more embodiments of the invention are directed an apparatus for removal of flooring. The flooring removal apparatus comprises a top frame with two side members coupled to a front plate and a rear member.

In one or more embodiments, each one of the side members comprises a first member and a second member with the first member located inside a lumen through a proximal end of a second member. The front plate is vertically coupled at both ends to a distal end of the second member of two side members and the rear member is coupled at both ends to a proximal end of the first member of the two side members to form the top frame.

In one or more embodiments, the top frame is telescopically adjustable through the two side members. The front plate is fixedly coupled to a top side of the top frame and the rear member further comprises a handle at each end extending outside the top frame.

Embodiments of the invention are configured to securely hold a jack hammer thus a front brace is fixedly coupled to the top end of the front plate. The front brace is configured to clamp a distal end of the housing of the jack hammer. Also, a rear brace configured to clamp the proximal end of the housing of the jack hammer is coupled to the two side members.

One or more embodiments of the present invention further comprise a vertical rear frame with two leg members, a bottom plate and an intermediate plate.

In one or more embodiments, each one of the leg members is telescopically adjustable and comprises a first vertical member and a second vertical member. The first vertical member is located inside a lumen through a distal end of the second vertical member. The distal end of each of the first vertical members is coupled to an end of the bottom plate, with the bottom plate in a horizontal orientation. Additionally, each of the second vertical members is coupled to the intermediate plate to form the vertical rear frame.

Each of the second vertical members is coupled at its proximal end to a proximal end of the second member of two side members of the top frame. In one or more embodiments, the vertical rear frame is rotatable into a stow position.

In one or more embodiments, each of the first vertical members includes a rear wheel at its distal end for directional control. The rear wheels may be lockable to prevent rolling and preferably has 360 degrees of freedom in the vertical axis.

In one or more embodiments, the vertical rear frame further comprises an adjustment screw coupled via a bearing to the bottom plate and also routed through a hole in the intermediate plate. The intermediate plate further includes a nut coupled thereto and with the adjustment screw for height adjustment.

In one or more embodiments, a truss comprising two front wheels coupled to an axle is coupled to the bottom side of the top frame at the distal end of the two side members.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
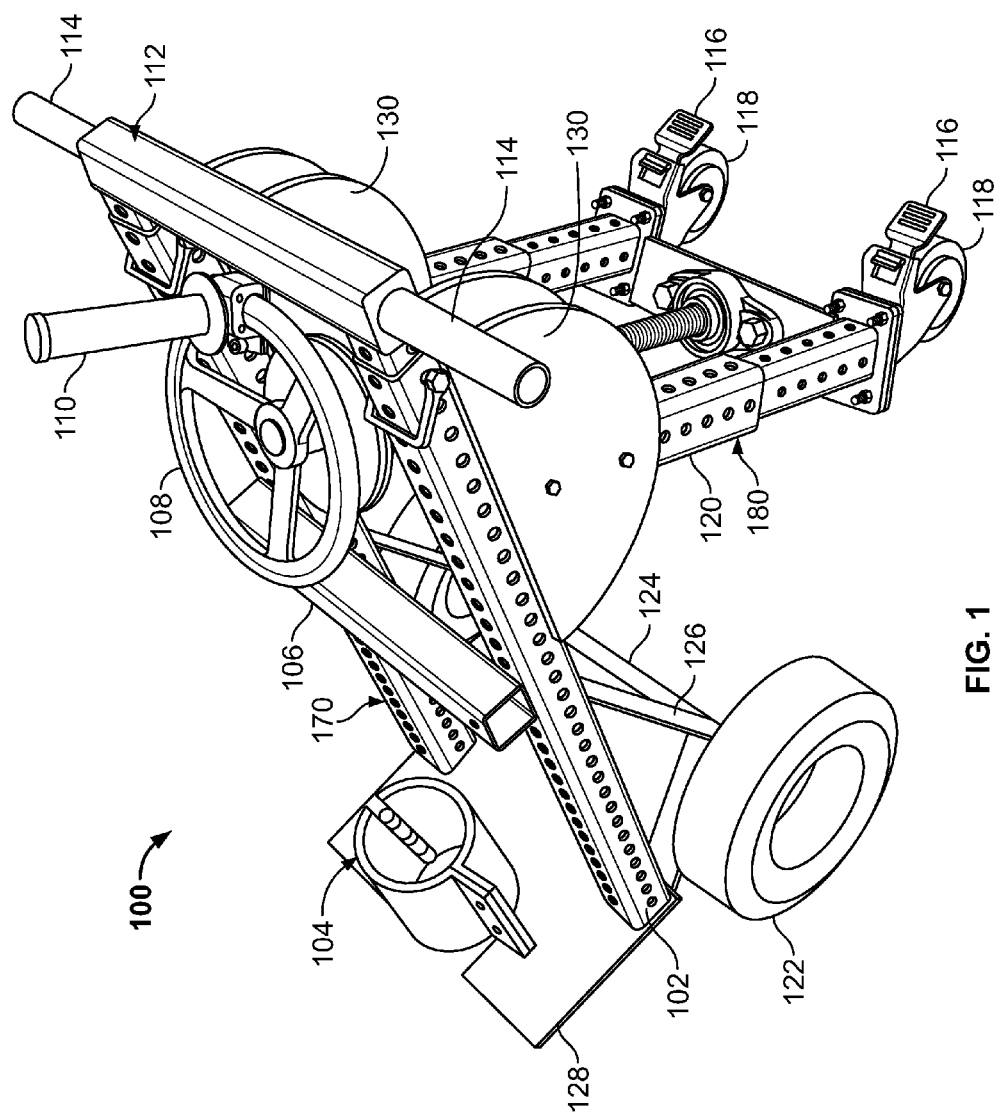
FIG. 1 is a left side perspective view of the flooring removal apparatus in accordance with one or more embodiments of the present invention.

The present invention comprising an apparatus for removal of flooring will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention will now be described with references to FIGS. 1-9.

As illustrated, one or more embodiments of the present invention comprise a flooring removal apparatus 100 with a top frame 170 and a vertical rear frame 180. The top frame 170 comprises two telescopically adjustable side members 102, a front end plate 128, and a rear end member 112.

Figure 3:
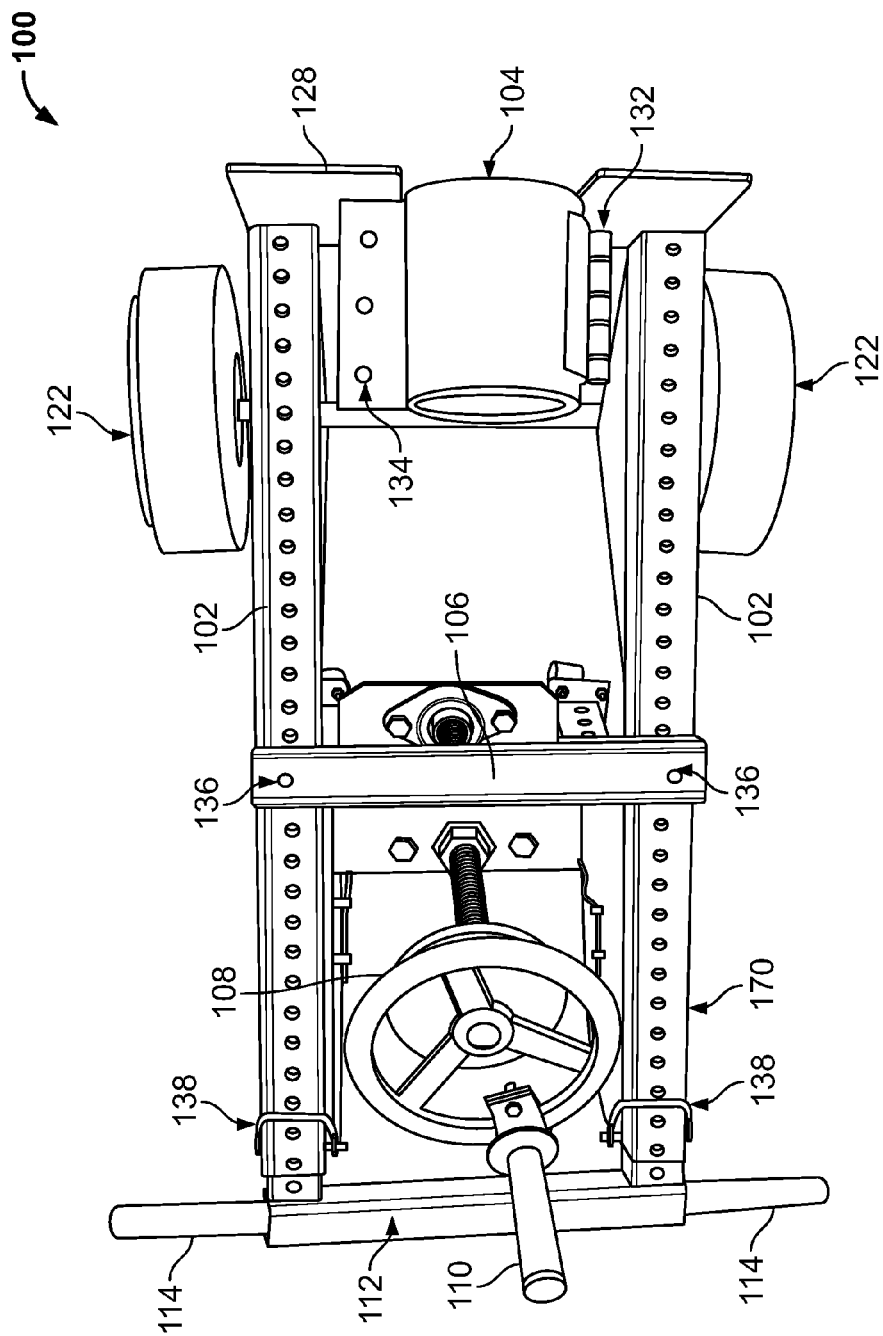
FIG. 3 is a top side view of the flooring removal apparatus in accordance with one or more embodiments of the present invention.
Figure 6:
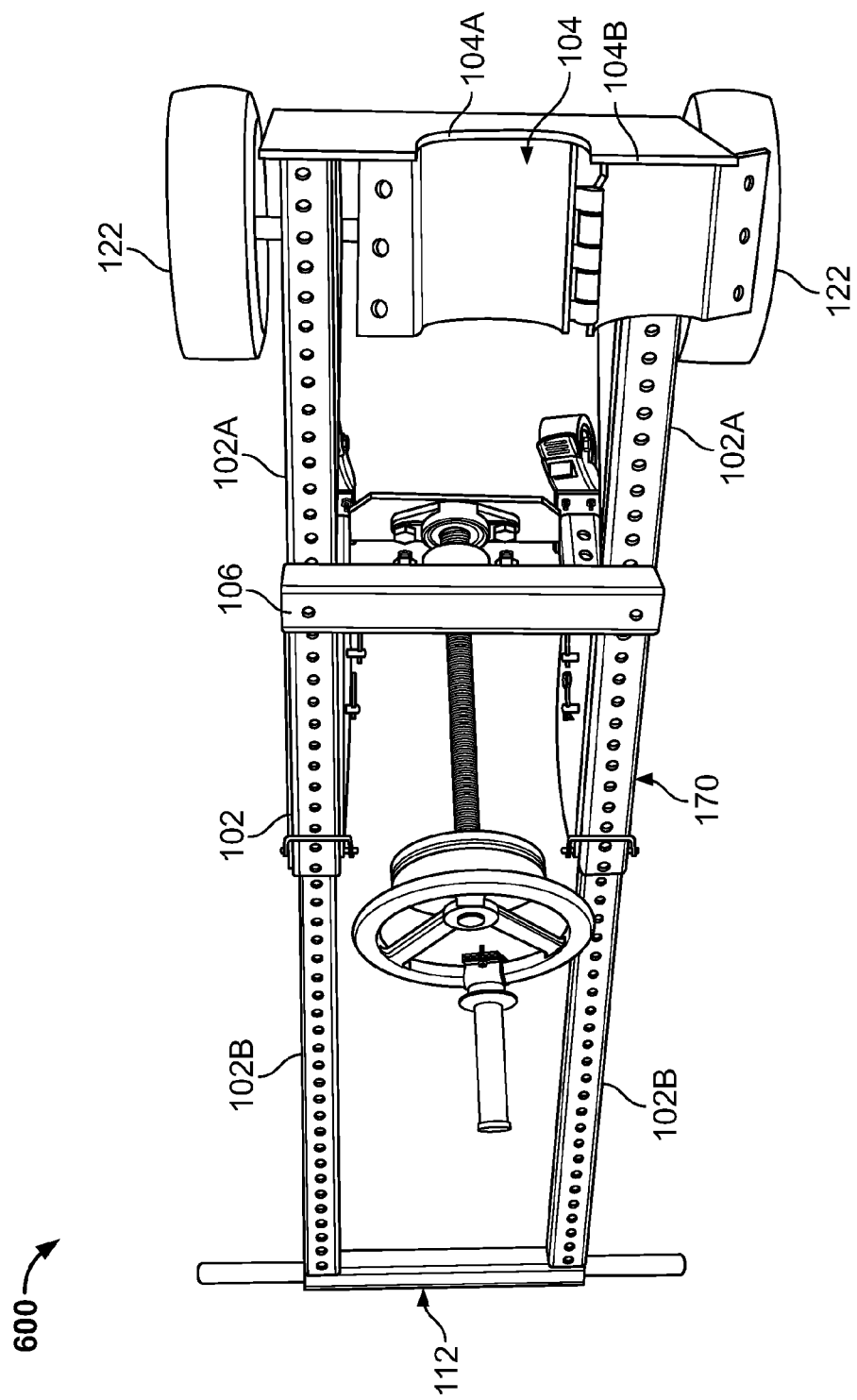
FIG. 6 is a top side view of the flooring removal apparatus with the arm in the extended position in accordance with one or more embodiments of the present invention.

Front end plate 128 further comprises front brace 104 for tightly securing the distal end of a housing of a jack hammer 804 to front end plate 128. Front brace 104 comprises fixed member 104A and movable flap 104B (see FIG. 6) coupled together with hinge 132 (FIG. 3). Flap 104B is moveable in either an open or closed position. In the open position, as illustrated in FIG. 6, flap 104B accepts placement of the housing of jack hammer 804 onto the top frame 170. Once the jack hammer 804 is placed onto the top frame 170, flap 104B can be placed in the closed position and secured with latch 134 thereby clamping the distal end of the housing of jack hammer 804 tightly in place. Latch 134 may be a bolt and nut system or any other suitable latching mechanism that would securely hold the housing of jack hammer 804 in place.

Each one of side members 102 comprises a member 102B, which fits and slides inside a lumen of a member 102A at the proximal end of member 102A. Both members 102A and 102B comprise a plurality of slot holes 140. Thus, side member 102 is adjustable between a fully retracted position, as illustrated in FIG. 1, and a fully extended position, as illustrated in FIG. 6. Pins 138 may be used to fix side members 102 at the desired extension, i.e. length. Those of skill in the art would appreciate those embodiments wherein the top frame is fixed in dimension and not telescopically adjustable is contemplated and that such embodiments fall within the scope of the present invention.

Rear end member 112 further comprises a pair of handles 114, one coupled to each end of the rear member. In one or more embodiments, each handle 114 may further include at least one soft handle bar grip coupled with the handle.

One or more embodiments of the present invention further includes a rear brace comprising bar 106 and a belt 806 coupled on each end to side members 102. Bar 106 could be made of any material capable of supporting the weight of jack hammer 804. For instance, bar 106 could be made of the same material as top frame 170. Bar 106 further comprises coupling holes 136 on each end for securing belt 806 in place. Those of skill in the arts would appreciate that although two braces are shown, i.e. a front brace and a rear brace, that other embodiments are contemplated that may only have one brace or more than two braces so long as the function of securing the housing of the jack hammer to the top frame is accomplished.

Belt 806 clamps the proximal end, i.e. motor end, of the housing of jack hammer 804 to bar 106. Belt 806 could be made of any material capable of securing jack hammer 804 tightly to bar 106 to essentially prevent movement or separation of the housing of jack hammer 804 during operation. For instance, belt 806 may be metal, composite, or any other suitable material. Belt 806 further comprises holes 808 at each end for latching onto holes 136 on bar 106. A bolt and nut system, or any other suitable latching mechanism, may be used to securely hold the proximal end of jack hammer 804 in place on bar 106.

In one or more embodiments, flooring removal apparatus 100 further comprises two front wheels 122 at the front end. Each one of front wheels 122 is coupled to one end of axle 124 of truss member 126, which is coupled to the bottom side and distal end of top frame 170. Those of skill in the art would appreciate that Axle 124 could be fixed or rotatable.

Top frame 170 further comprises one or more semi disks 130 coupled to the proximal end and bottom of side member 102A. In the illustrated embodiments, the flat end of a semi disk 130 is fixedly coupled to each side of side member 102A at the bottom side.

In one or more embodiments, vertical rear frame 180 comprises two telescopically adjustable leg members 120, bottom plate 149, intermediate plate 150, and height adjustment screw 146.

Figure 2:
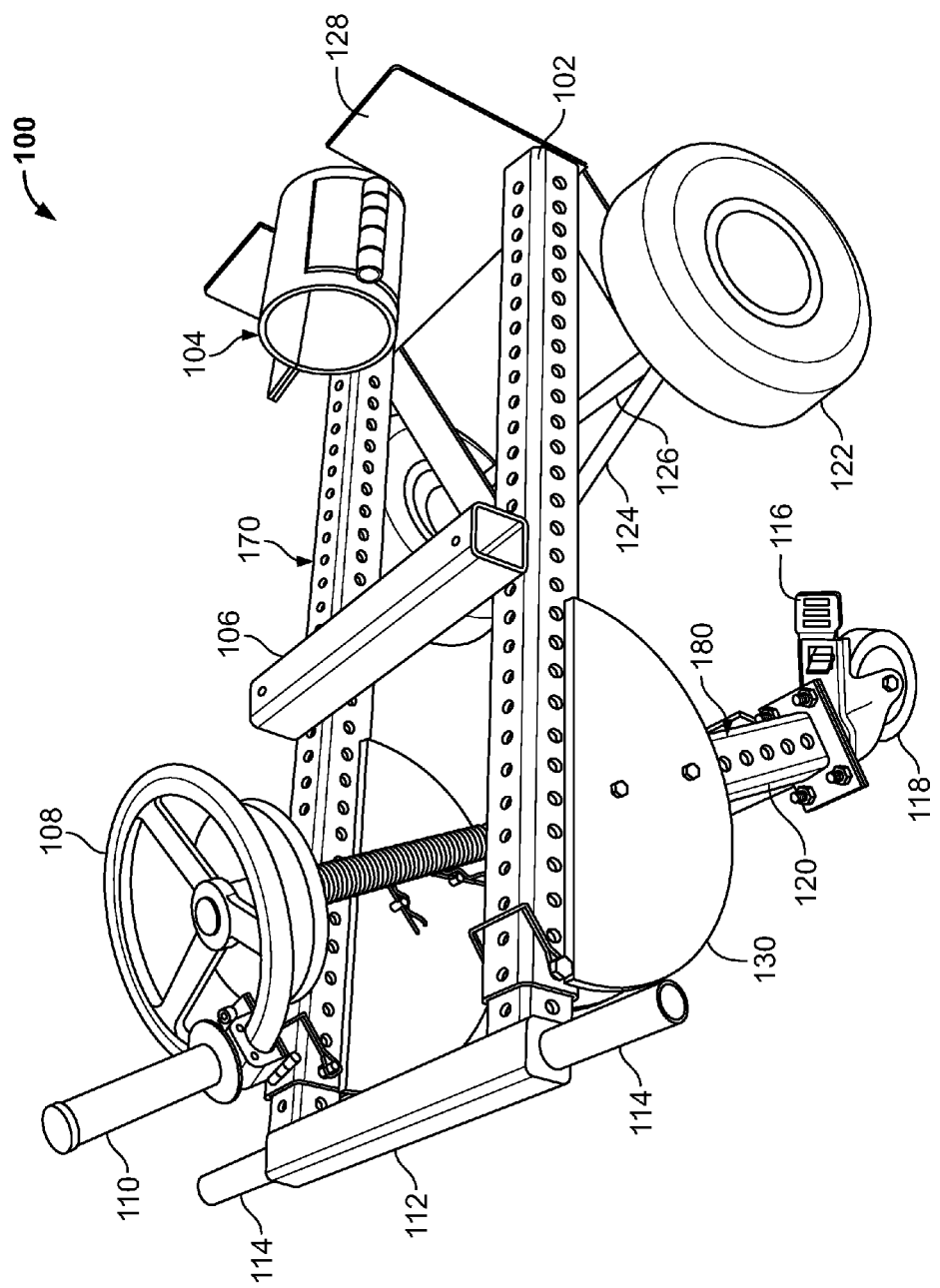
FIG. 2 is a right side perspective view of the flooring removal apparatus in accordance with one or more embodiments of the present invention.
Figure 4:
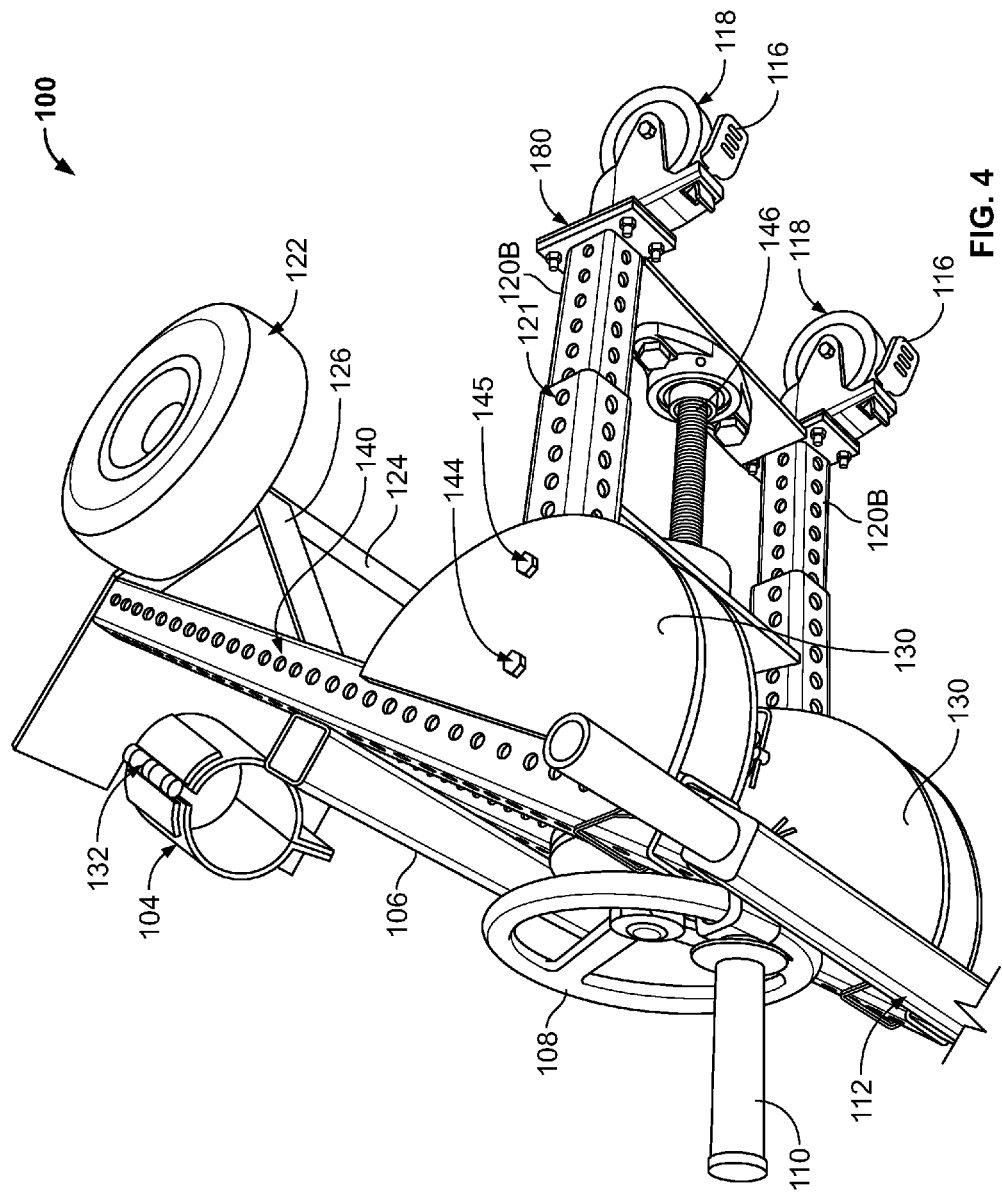
FIG. 4 is a back side perspective view of the flooring removal apparatus in accordance with one or more embodiments of the present invention.
Figure 5:
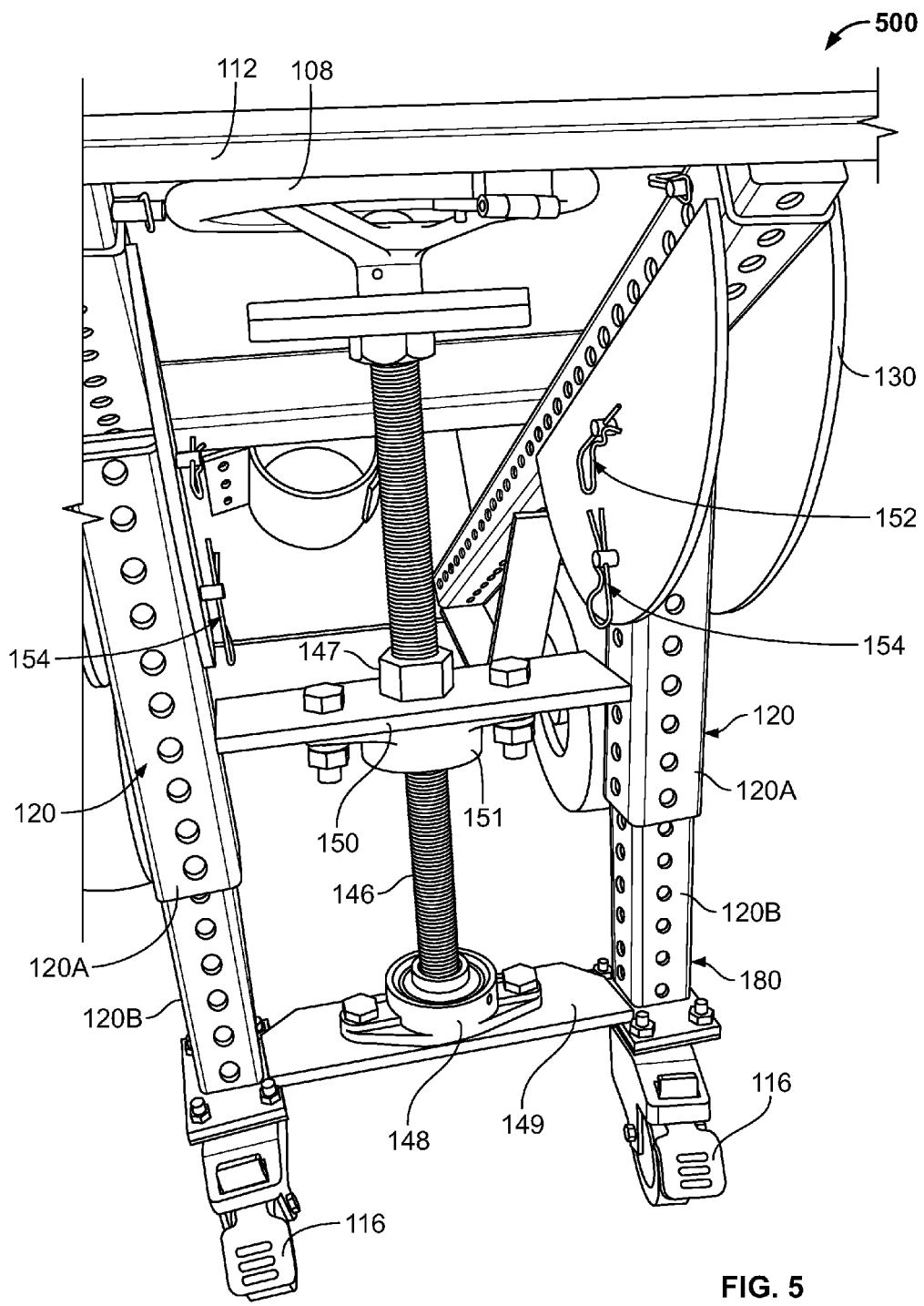
FIG. 5 is a close-up view of the back side of the flooring removal apparatus in accordance with one or more embodiments of the present invention.
Figure 7:
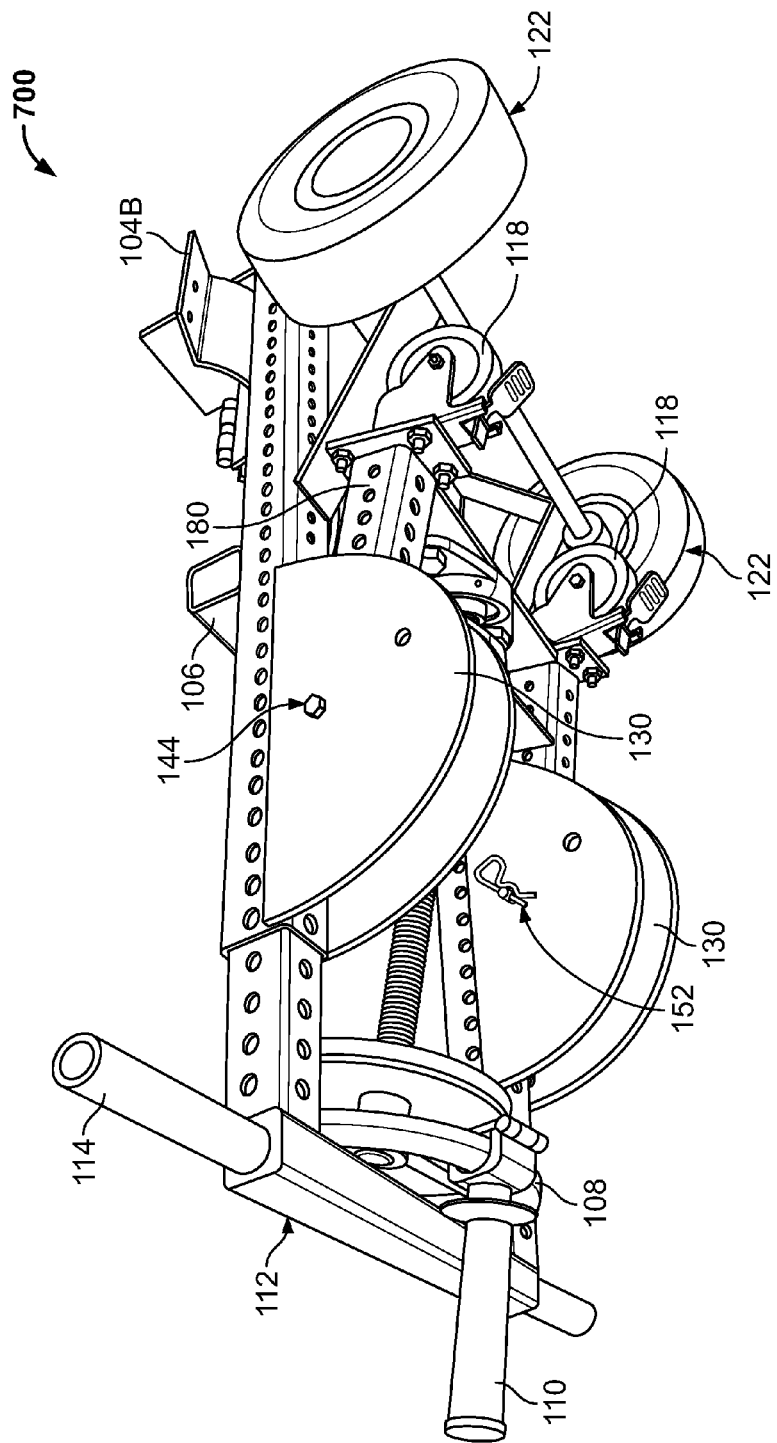
FIG. 7 is a bottom side perspective view of the flooring removal apparatus in a folded position in accordance with one or more embodiments of the present invention.

Each one of leg members 120 comprises leg member 120B, which fits and slides inside a lumen of leg member 120A. Both leg members 120A and 120B comprise a plurality of slot holes 121. Thus, leg members 120 are adjustable between a fully retracted position, as illustrated in FIGS. 2 and 7, and a fully extended position, as illustrated in FIGS. 1, 4 and 5. Height adjustment screw 146 is used to set the height of rear frame 180 to a desired vertical position for the operator. Those of skill in the art would appreciate those embodiments wherein the vertical rear frame is fixed in dimension and not telescopically adjustable is contemplated and that such embodiments fall within the scope of the present invention.

The proximal end of each leg member 120A of rear frame 180 is coupled to semi disks 130 using bolt 144 and pin 152 combination; and bolt 145 and pin 154 combination. The bolt 145 and pin 154 combination may be removed to allow rotation and stowing of the rear frame 180 when desired to reduce the footprint of the flooring removal apparatus 100, as illustrated in FIG. 7. In the configuration 700, flooring removal tool may be stowed with the front end plate 128 placed on the floor, similar to stowing of a hand dolly/truck.

Height adjustment screw 146 preferably runs through the center of rear frame 180 (see FIG. 5) and comprises an adjustment wheel 108 and an adjustment handle 110, coupled to adjustment wheel 108, at its top end. Adjustment wheel 108 and adjustment handle 110 are the means for turning height adjustment screw 146 to achieve a desired height for rear frame 180. Height of rear frame 180 may be adjusted such that handle 114 of the top frame 170 is in a comfortable position for the operator of flooring removal apparatus 100 during operation.

In operation, an operator holds onto handles 114 while operating the flooring removal apparatus in order to maneuver around the area for which flooring is being removed.

Each leg member 120B further comprises a rear wheel 118 coupled to its bottom end. Rear wheel 118 provides directional control thus, preferably, has 360 degrees of freedom about its vertical axis. Rear wheel 118 further comprises a wheel lock mechanism 116 that may be used to lock the wheel to prevent rolling motion. Those of skill in the art would appreciate that the vertical rear frame could be configured with one or more rear wheels. For instance, the flooring removal apparatus may be configured as a tri-wheeled device with two front wheels and one rear wheel. And, other wheel configurations are possible without deviation from the spirit of the invention.

Each end of bottom plate 149 is fixedly coupled to a leg member 120B, at or near the bottom end to form the bottom end of rear frame 180. Bottom plate 149 further comprises bearing housing 148 fixedly coupled to its topside for securing the bottom end of height adjustment screw 146. Those of skill in the art would appreciate that bearing 148 could be a ball bearing or any other type of mechanical component capable of providing support for the distal end of the height adjustment screw while allowing free rotation of the height adjustment screw.

Each end of intermediate plate 150 is fixedly coupled to a leg member 120A to form the opposing end of rear frame 180. Intermediate plate 150 further comprises a hole through which the height adjustment screw 146 is mounted. Intermediate plate 150 further comprises a nut 147 fixedly coupled to its top side and aligned with the hole and integrated with the height adjustment screw.

In one or more embodiments, intermediate plate 150 further comprises a guide housing 151 fixedly coupled to its bottom side for supporting an intermediate end of height adjustment screw 146.

One or more embodiments of the present invention may further comprise an adapter 802 that is couplable to the distal tip of jack hammer 804. Adapter 802 may be sized and configured for different types of flooring.

Figure 8:
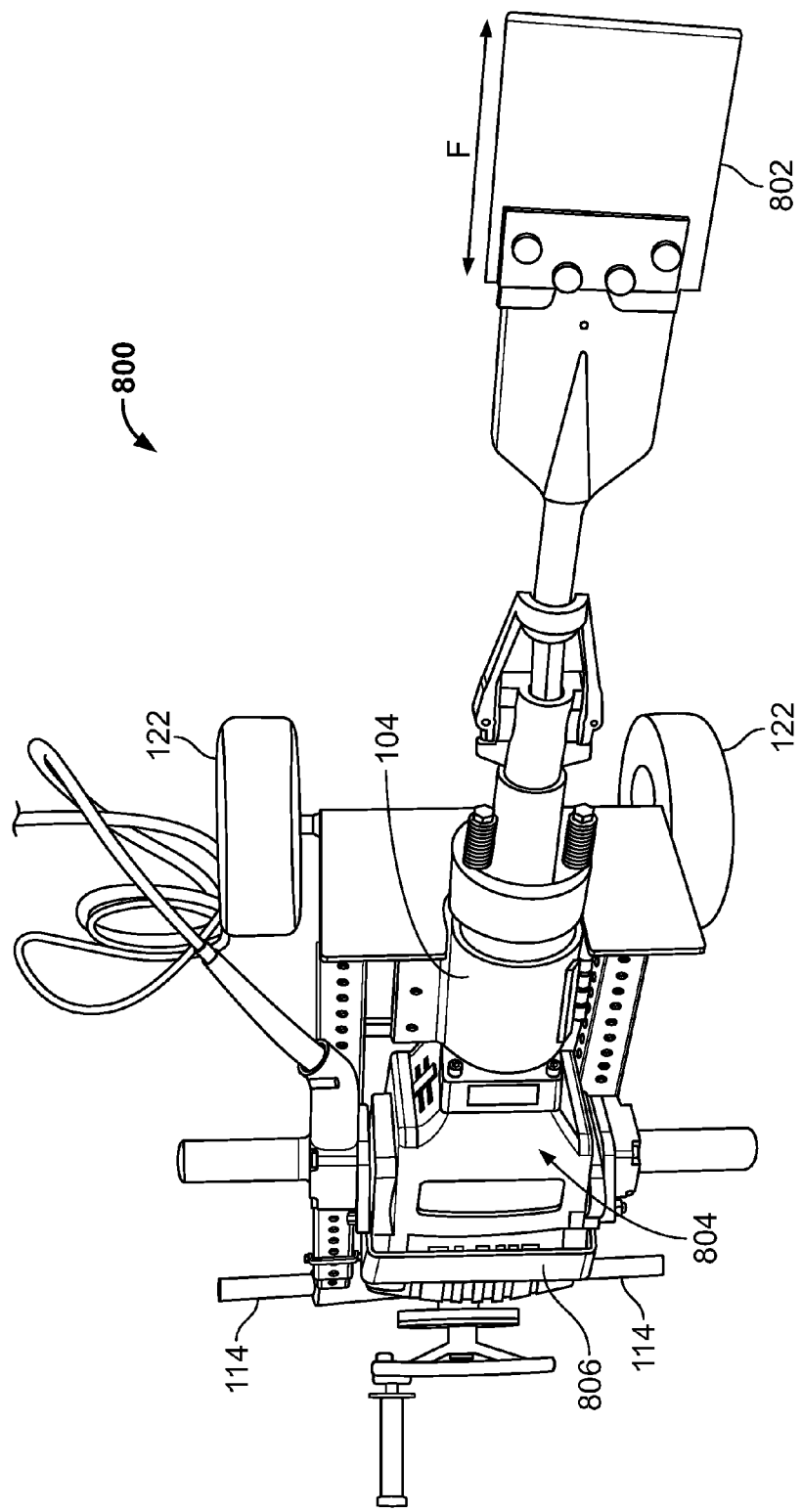
FIG. 8 is a front side perspective view of the flooring removal apparatus with a jack hammer attached in accordance with one or more embodiments of the present invention.
Figure 9:
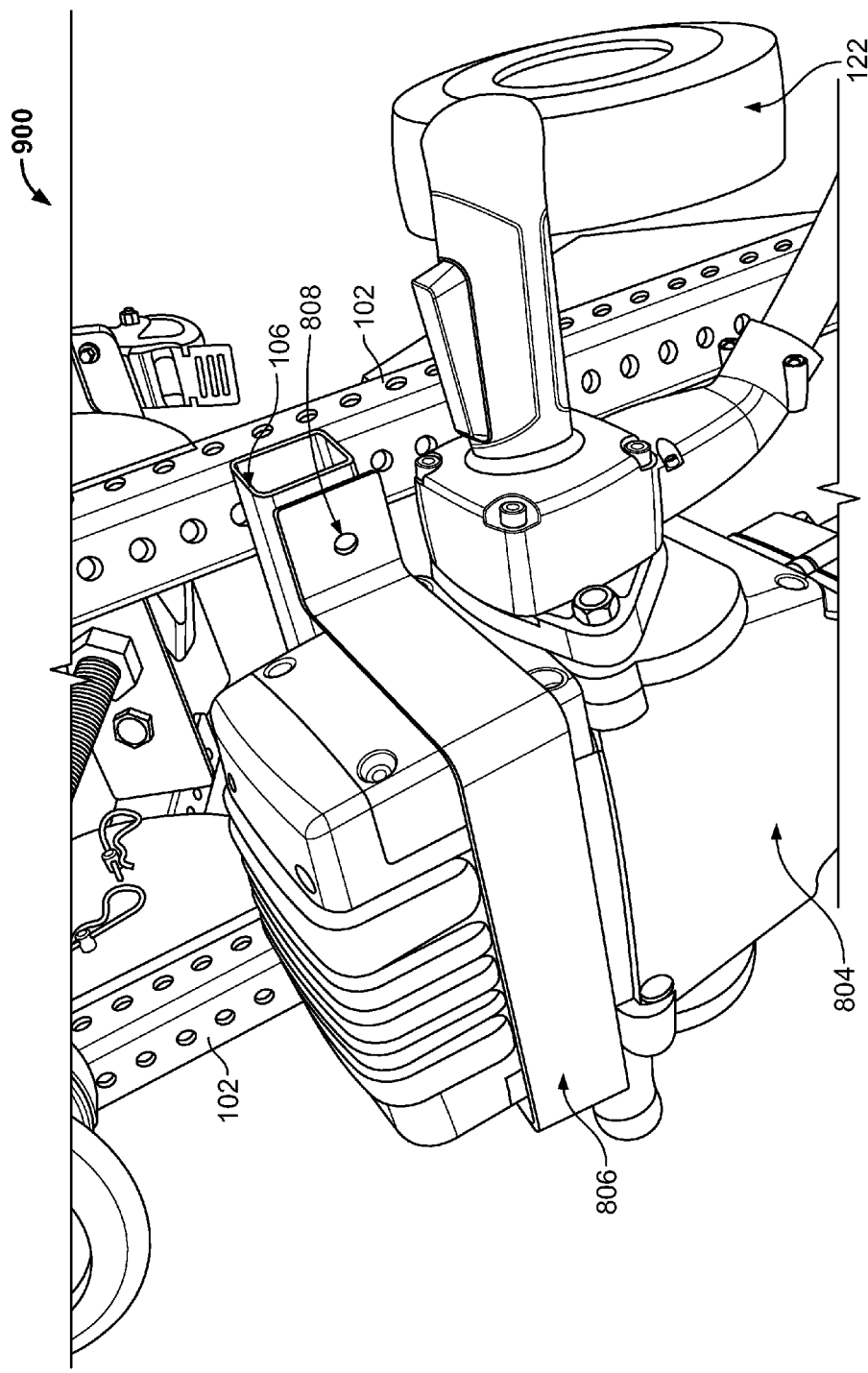
FIG. 9 is a close-up view of the top side of the flooring removal apparatus with a jack hammer attached in accordance with one or more embodiments of the present invention.

In operation, jack hammer 804 produces rapid and instantaneous force, F, in the direction shown in FIG. 8. With the adapter 802 at or near the subflooring, the instantaneous and rapid linear force exerted on the flooring material results in immediate and rapid removal of the flooring material. Thus, work that traditionally takes several hours with currently available tools would take a fraction of the time to complete with embodiments of the flooring removal apparatus of the present invention.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for removal of flooring comprising:
a top frame comprising two side members, a front plate and a rear member, wherein each one of the side members comprises an inner member inside a lumen through a proximal end of an outer member, wherein the front plate is vertically coupled at a first end to a distal end of the outer member of a first one of the two side members and coupled at an opposing end to a distal end of the outer member of a second one of the two side members, and the rear member is coupled at a first end to a proximal end of the inner member of the first one of the two side members and coupled at an opposing end to a proximal end of the inner member of the second one of the two side members, wherein the top frame is telescopically adjustable through the two side members, wherein said front plate is fixedly coupled to a top side of said top frame, wherein said rear member further comprises at least one handlebar extending outside said top frame;
a front brace fixedly coupled to a top end of said front plate and configured to clamp a distal end of a housing of a jack hammer;
a rear brace coupled to the second member of the two side members and configured to clamp a proximal end of the housing of the jack hammer;
a vertical rear frame comprising two telescopically adjustable leg members, wherein each one of the leg members comprises a first vertical member inside a lumen through a distal end of a second vertical member, wherein a distal end of the first vertical member of a first one of the two leg members is coupled to one end of a bottom plate and a distal end of the first vertical member of a second one of the two leg members is coupled to an opposing end of the bottom plate, wherein the second vertical member of the first one of the two leg members is coupled to one end of an intermediate plate and the second vertical member of the second one of the two leg members is coupled to an opposing end of the intermediate plate, wherein the vertical rear frame further comprises an adjustment screw coupled via a bearing to said bottom plate and through said intermediate plate, wherein the second vertical member of the first one of the two leg members is coupled at its proximal end to the proximal end of the outer member of the first one of the two side members of the top frame and the second vertical member of the second one of the two leg members is coupled at its proximal end to the proximal end of the outer member of the second one of the two side members of the top frame, wherein each of the first vertical members comprises a rear wheel at its distal end; and
a truss comprising two front wheels, wherein said truss is coupled to a bottom side of said top frame at the distal end of each of the outer members of the two side members.

2. The apparatus for removal of flooring of claim 1, wherein said truss comprises an axle and each of the front wheels is coupled to an end of the axle.

3. The apparatus for removal of flooring of claim 1, further comprising an adapter configured to couple to a distal tip of said jack hammer.

4. The apparatus for removal of flooring of claim 1, wherein said rear wheel provides directional control.

5. The apparatus for removal of flooring of claim 1, wherein said adjustment screw further comprises an adjustment handle at its top end.

6. The apparatus for removal of flooring of claim 1, wherein said intermediate plate further comprises a nut coupled thereto and with said adjustment screw for setting a height of said rear frame.

7. An apparatus for removal of flooring comprising:
a top frame comprising two side members, a front plate and a rear member, wherein each one of the side members comprises an inner member inside a lumen through a proximal end of an outer member, wherein the front plate is vertically coupled at a first end to a distal end of the outer member of a first one of the two side members and coupled at an opposing end to a distal end of the outer member of a second one of the two side members, and the rear member is coupled at a first end to a proximal end of the inner member of the first one of the two side members and coupled at an opposing end to a proximal end of the inner member of the second one of the two side members, wherein the top frame is telescopically adjustable through the two side members, wherein said front plate is fixedly coupled to a top side of said top frame, wherein said rear member further comprises at least one handlebar extending outside said top frame;

at least one brace fixedly coupled to a top side of said top frame and configured to securely clamp a housing of a jack hammer to said top frame;

a vertical rear frame comprising two telescopically adjustable leg members coupled to a bottom plate and an intermediate plate to form said vertical rear frame and an adjustment screw coupled via bearings to said bottom plate and said intermediate plate, wherein each of said telescopically adjustable leg members is coupled at its proximal end to a proximal end of the outer member of a corresponding one of the two side members of the top frame, wherein each of the two telescopically adjustable leg members comprises a rear wheel at its distal end; and a truss comprising two front wheels and coupled to a bottom side of said top frame at the distal end of each of the outer members of the two side members.

8. The apparatus for removal of flooring of claim 7, wherein said truss comprises an axle between said front wheels.

9. The apparatus for removal of flooring of claim 7, further comprising an adapter configured to couple to a distal tip of said jack hammer.

10. The apparatus for removal of flooring of claim 7, wherein said rear wheel provides directional control.

11. The apparatus for removal of flooring of claim 7, wherein said adjustment screw further comprises an adjustment handle at its top end.

12. The apparatus for removal of flooring of claim 7, wherein said intermediate plate further comprises a nut coupled thereto and with said adjustment screw for setting a height of said rear frame.

13. An apparatus for removal of flooring comprising:

a top frame comprising two side members, a front plate and a rear member, wherein the front plate is vertically coupled at a first end to a distal end a first one of the two side members and coupled at an opposing end to a distal end of a second one of the two side members, wherein said front plate is fixedly coupled to a top side of said top frame, wherein said rear member further comprises at least one handlebar extending outside said top frame;

at least one brace fixedly coupled to a top side of said top frame and configured to securely clamp a housing of a jack hammer to said top frame;

a vertical rear frame comprising two leg members coupled to a bottom plate and an intermediate plate to form said vertical rear frame, wherein each of said leg members is coupled at its proximal end to a proximal end of the two side members, wherein the vertical rear frame comprises at least one rear wheel at its distal end; and at least one front wheel coupled to a bottom side of said top frame at the distal end of each of the two side members.

14. The apparatus for removal of flooring of claim 13, wherein said top frame is telescopically adjustable in length.

15. The apparatus for removal of flooring of claim 13, wherein said vertical rear frame is telescopically adjustable in height.

16. The apparatus for removal of flooring of claim 15, further comprising an adjustment screw coupled to the bottom plate via a bearing and through said intermediate plate.

17. The apparatus for removal of flooring of claim 16, wherein said adjustment screw further comprises an adjustment handle at its top end.

18. The apparatus for removal of flooring of claim 16, wherein said intermediate plate further comprises a nut coupled thereto and with said adjustment screw for setting a height of said rear frame.

19. The apparatus for removal of flooring of claim 13, wherein said at least one rear wheel provides directional control.

20. The apparatus for removal of flooring of claim 13, wherein each of said two front wheels is mounted on an end of an axle, wherein said axle is coupled to a truss at a bottom side of said top frame.

* * * * *